(12) United States Patent
Nair et al.

(10) Patent No.: US 11,330,070 B1
(45) Date of Patent: May 10, 2022

(54) CONTAINERIZED WORKFLOW ENGINES EXECUTING METADATA FOR USER-DEFINED APPLICATIONS

(71) Applicant: salesforce.com, inc., San Francisco, CA (US)

(72) Inventors: Kiran Hariharan Nair, Dublin, CA (US); Nikhil Kataria, Emeryville, CA (US); Alexander John Trzeciak, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/162,453

(22) Filed: Jan. 29, 2021

(51) Int. Cl.
| | |
|---|---|
| *H04L 29/08* | (2006.01) |
| *H04L 67/561* | (2022.01) |
| *H04L 67/5682* | (2022.01) |
| *H04L 67/306* | (2022.01) |
| *H04L 67/63* | (2022.01) |
| *H04L 67/1097* | (2022.01) |

(52) U.S. Cl.
CPC ...... *H04L 67/2804* (2013.01); *H04L 67/1097* (2013.01); *H04L 67/2852* (2013.01); *H04L 67/306* (2013.01); *H04L 67/327* (2013.01)

(58) Field of Classification Search
CPC ............. H04L 67/2804; H04L 67/1097; H04L 67/2852; H04L 67/306; H04L 67/327
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

FOREIGN PATENT DOCUMENTS

| | | | |
|---|---|---|---|
| CN | 110825362 A | * | 2/2020 |
| CN | 112214214 A | * | 1/2021 |

*Primary Examiner* — Jonathan A Bui
(74) *Attorney, Agent, or Firm* — Dergosits & Noah LLP; Todd A. Noah (57) ABSTRACT

Containerized workflow engines executing metadata for user-defined applications are described. A system utilizes user selections for configuring a user-defined application to identify application definition metadata. The system stores the application definition metadata for the user-defined application into a persistent storage. A workflow engine executes in a software container in response to receiving user context details and an invocation of the user-defined application. The workflow engine retrieves the application definition metadata from the persistent storage. The workflow engine inputs the user context details and executes the application definition metadata. The workflow engine outputs a result based on executing the application definition metadata.

20 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0225118 A1* | 9/2011 | Wu ................. G06F 16/335 707/608 |
| 2012/0233137 A1 | 9/2012 | Jakobsen et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2014/0359537 A1 | 12/2014 | Jakobsen et al. |
| 2015/0007050 A1 | 1/2015 | Jakobsen et al. |
| 2015/0095162 A1 | 4/2015 | Jakobsen et al. |
| 2015/0172563 A1 | 6/2015 | Jakobson et al. |
| 2018/0321833 A1* | 11/2018 | Nelson .............. G06F 9/54 |
| 2019/0236175 A1* | 8/2019 | Cham ............ G06F 11/3476 |
| 2020/0097979 A1* | 3/2020 | Dubey ............ H04L 67/306 |
| 2021/0112065 A1* | 4/2021 | Yang ............... H04L 63/108 |
| 2021/0160288 A1* | 5/2021 | Crabtree ......... G06F 16/951 |

* cited by examiner

CONTAINERIZED WORKFLOW ENGINES EXECUTING METADATA FOR USER-DEFINED APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As a result of the microcomputer revolution, businesses have deployed computers widely across their employee bases, using software to enable widespread automation of business processes. The need for software automation and new software applications for business processes places demands on software developers to create large numbers of custom software applications tailored for each organization's unique needs. No-code development platforms and low-code development platforms have been and are used as a means to allow for quick creation and use of working software applications that can address the specific process and data needs of an organization.

These no-code and low-code development platforms provide development environments used to create software applications through graphical user interfaces and configuration instead of traditional hand-coded computer programming. Both a no-code development model and a low-code development model enable developers of varied experience levels to create software applications using a visual user interface in combination with model-driven logic. Such development platforms may produce entirely operational software applications or may require additional coding for specific situations. By reducing the amount of traditional hand coding required to create software applications, a limited coding development platform enables accelerated delivery of software applications. A common benefit is that a wider range of people can contribute to developing software applications—not only those people with formal programming skills. These development platforms can also lower the initial cost of setup, training, deployment, and maintenance.

Many distinctions between no-code development platforms and low-code development platforms can seem blurry, but some key distinctions set apart the design and use cases for each type of development platform. No-code development platforms are generally accessible to any end-business user while low-code development platforms typically require developers with some knowledge of coding languages who can work within a development platform's constraints to streamline the development process. No-code development platforms tend to function off a model-driven, declarative approach where the end user dictates a software application's design through drag and drop manipulation or simple logic. Low-code development platforms often employ a similar development model, but with a greater dependence on hard code for dictating a software application's core architecture. No-code development platforms most often rely on a preset user interface layer which simplifies and streamlines a software application's design. Low-code development platforms may provide greater flexibility in user interface options, but at the cost of additional coding requirements.

These limited coding development platforms have increased in popularity as companies deal with the parallel trends of an increasingly mobile workforce and a limited supply of competent software developers. Such development platforms can vary widely in their functionality, integrations, and market niche to develop software applications, which may focus solely on a specific business function, such as data capture or workflow, while other software applications may integrate entire enterprise resource planning tools into a mobile form factor. A software application that may be built by a no-code development platform or by a low-code development platform may be referred to as a no-code development application, a low-code development application, a no/low-code development application, or a user-defined application. Therefore, a user-defined application can be a computer program or piece of software that is configured by a computer operator to fulfill a particular purpose of computer operators.

A software application for a workflow engine, which may be referred to as an orchestration engine, a flow engine, or a workflow orchestration engine, can execute other software applications, such as no-code development applications and low-code development applications. Consequently, a workflow engine can be a software application that facilitates the management of information, tasks, and/or events for business processes which typically use a database server. Since a workflow engine can execute no-code development applications and low-code development applications, a no-code development application or a low-code development application may be referred to as a workflow application. Since such workflow applications may be built by no-code development platforms and low-code development platforms, a no-code development platform or a low-code development platform may be referred to as a workflow builder.

A workflow engine can verify whether the status of a current business process permits the workflow engine to execute a specific task. If the current business process status permits execution of the task, the workflow engine can then determine the authority of the current user to check if the current user is permitted to execute the task. If the current user is permitted to execute the task, the workflow engine executes the software application for the task, which may be a no-code development application or a low-code development application. If the execution of the task's software application successfully completes, the workflow engine can return the result of the successful execution. If the execution of the task's software application fails to successfully complete, the workflow engine can report an error, which can result in rolling back a change to a database that was made by the unsuccessfully completed task.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

An organization may use different workflow engines in different environments, such as a first workflow engine that executes in a server that has direct access to the organization's customer relationship management (CRM) system and a second workflow engine that executes asynchronous batch processes when access to the server's CRM system is available. The organization's workflow engine environments also include a third workflow engine that executes in the browser of a sales manager's laptop computer and a fourth workflow engine that executes in the mobile application of the sales manager's smart phone. While connected to the Internet, the laptop computer and the smart phone execute their respective workflow engines to authenticate the sales manager and store the sales manager's user context details to persistent storage on the laptop computer and the smart phone, respectively. When subsequently disconnected from the Internet, the laptop computer and the smart phone access their respective persistent storages to authenticate the sales manager and then execute their respective workflow engines, which enables the developing and testing of new workflow applications.

However, since these workflow engines may be written in different coding languages and execute in different environments, on occasions they may produce different results based on the same inputs. Standardizing the results by replacing any of these workflow engines with a copy of one of the other workflow engines may not be an option due to the lack of portability for the workflow engines. Furthermore, the server has the greatest capacity for scaling out a workflow engine as needed, but the server may not have sufficient capacity during some high-demand occasions.

In accordance with embodiments described herein, there are provided systems and methods for containerized workflow engines executing metadata for user-defined applications. A system can deploy a workflow engine to a software container, of multiple software containers, in a cloud computing environment. The system utilizes user selections for configuring a user-defined application to identify application definition metadata. The system stores the application definition metadata for the user-defined application into a persistent storage. The workflow engine receives user context details and an invocation of the user-defined application, and then executes in the software container to retrieve the application definition metadata from the persistent storage. The workflow engine inputs the user context details and then executes the application definition metadata. The workflow engine outputs a result based on executing the application definition metadata.

For example, a system deploys a copy of a server's workflow engine and a copy of the server's workflow builder to a cloud software container in a Google® cloud platform as a cloud workflow engine and a cloud workflow builder. After Acme Corporation sales manager Ann made selections using the cloud workflow builder to configure a cloud workflow application for customer orders service, the system uses her selections to identify the cloud's application definition metadata for workflow customer orders service. The system stores the cloud's application definition metadata for workflow customer orders service into the cloud software container, which stores the cloud workflow engine. When Acme's customer Bob uses his desktop computer to invoke the cloud workflow application for customer orders service, the cloud workflow engine receives Bob's authentication and authorization data. The cloud workflow engine executes in the cloud software container and retrieves the cloud application definition metadata for workflow customer orders service from the cloud software container. The cloud workflow engine inputs Bob's authentication and authorization data and executes the cloud's application definition metadata for workflow customer orders service, thereby executing the cloud workflow application for customer orders service. Then the cloud workflow engine, which is executing in the cloud software container, verifies Bob's identity as a favored customer who is permitted to order some Acme products at a discounted price, and outputs Bob's order of Acme products. Even if Bob orders the Acme products on Black Friday, the system can quickly scale out in the Google® cloud platform to provide large numbers of instances of the cloud workflow engine that can execute large numbers of instances of the cloud's application definition metadata for workflow customer orders service, and thereby can efficiently execute large numbers of instances of the cloud workflow application for customer orders service.

Systems and methods are provided for containerized workflow engines executing metadata for user-defined applications. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a system for containerized workflow engines executing metadata for user-defined applications. Next, methods for containerized workflow engines executing metadata for user-defined applications will be described with reference to example embodiments.

While one or more implementations and techniques are described with reference to an embodiment in which containerized workflow engines executing metadata for user-defined applications are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
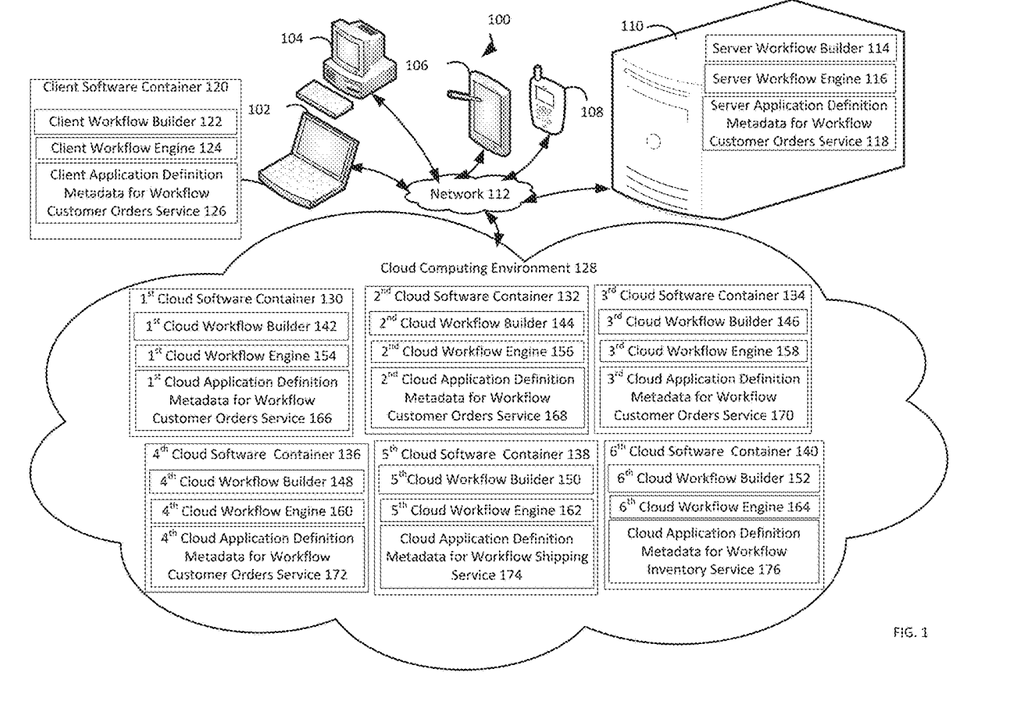
FIG. 1 is a block diagram of a high-level overview of a system for containerized workflow engines executing metadata for user-defined applications, in an embodiment.

FIG. 1 illustrates a block diagram of a system that implements containerized workflow engines executing metadata for user-defined applications, under an embodiment. As shown in FIG. 1, system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106; and a fourth client 108; and a server 110 that may be provided by a hosting company. The first client 102 may be a laptop computer and may be referred to as the Acme Corporation sales manage Ann's laptop computer 102, the second client 104 may be a desktop computer and may be referred to as the Acme customer Bob's desktop computer 104, the third client 106 may be a tablet computer and may be referred to as the Acme customer Chris' tablet computer 106, and the fourth client 108 may be a mobile telephone such as a smart phone and may be referred to as the Acme customer Dana's smart phone 108. The clients 102-108 and the server 110 communicate via a network 112.

The server 110, which may be referred to as the core application server 110, may include a server workflow builder 114, a server workflow engine 116, and sever application definition metadata for workflow customer orders service 118. Application definition metadata can be a set of information that describes other information that is used to build a computer program or piece of software designed and written to fulfill a particular purpose of a user. Ann's laptop computer 102 may include a client software container 120, which may include a client workflow builder 122, a client workflow engine 124, and client application definition metadata for workflow customer orders service 126. A software container, which may be referred to as a virtualization engine or a partition, can be an isolated user-space instance that wraps an executing application in a complete environment which includes everything that the application needs, such as memory, disk space, network access, and an operating system. Operating-system-level virtualization, also known as containerization, refers to an operating system feature in which an operating system kernel enables the existence of multiple isolated user-space instances.

The system 100 includes a cloud computing environment 128, which may include six cloud software containers 130-140, which may include six cloud workflow builders 142-152, respectively. The six cloud software containers 130-140 may also include six cloud workflow engines 154-164, respectively. The six cloud software containers 130-140 may additionally include six instances of cloud application definition metadata for workflow service 166-176, respectively, which include four instances of cloud application definition metadata for workflow customer orders service 166-172, one instance of cloud application definition metadata for workflow shipping service 174, and one instance of cloud application definition metadata for workflow inventory service 176. A cloud computing environment can be a platform that provides an on-demand availability of computer system resources without direct active management by a user of the computer system resources.

The cloud computing environment 128 may be implemented by a cloud platform as a service, such as Heroku, which supports several programming languages. The system 100 may implement the cloud software containers 130-140 in the cloud computing environment 128 by using a container-orchestration system, such as Kubernetes, for automating computer application deployment, scaling, and management. The cloud software containers 130-140 may be Docker cloud software containers 130-140. The cloud computing environment 128 may use a community project, such as Knative, to add components for deploying, running, and managing serverless, cloud-native applications. Serverless computing is a cloud computing execution model in which the cloud provider allocates machine resources on demand, taking care of the servers on behalf of their customers. The system 100 may use Evergreen to provide serverless functions.

Cloud services may be accessed through a co-located cloud computer service, a web service application programming interface (API), or by applications that utilize a web service API, such as cloud desktop application, a cloud gateway application, or Web-based content management systems. A cloud gateway application exposes an interface backed by a service offered by a cloud platform. Any request sent to the interface exposed by the cloud gateway application ends up being sent to a service offered by the cloud platform. The cloud gateway application can use cloud service application programming interfaces, such as Simple Object Access Protocol (SOAP) and Representational State Transfer (REST). The cloud service gateway application can serve as an intermediary to multiple cloud service providers, such as a Google® cloud platform, an Amazon Web Services® cloud platform, and/or a Microsoft® Azure cloud platform.

A workflow engine, which is backed by a cloud platform and provides a service, may have an interface that is exposed as a microservice. Microservices are based on a software development technique, and a variant of the service-oriented architecture style that structures a software application as a collection of loosely coupled services. In a microservices architecture, the loosely coupled services are fine-grained services and their communication protocols are lightweight. Consequently, a microservice can be a part of a software application which provides assistance to a user and is coupled with other parts of the software application which can provide related services to the user. Decomposing a software application into smaller services improves modularity, which makes the software application easier to understand, develop, and test. This software application decomposition parallelizes development by enabling small autonomous teams to develop, deploy, and scale their respective services independently.

FIG. 1 depicts the system 100 with four clients 102-108, one server 110, one network 112, eight workflow builders 114, 122, and 142-152, eight workflow engines 116, 142, and 154-164, eight instances of application definition metadata for workflow service 118, 126, and 166-176, and seven software containers 120 and 130-140. However, the system 100 may include any number of each of the clients 102-108, server 110, network 112, workflow builders 114, 122, and 142-152, workflow engines 116, 142, and 154-164, instances of application definition metadata for workflow service 118, 126, and 166-176, and software containers 120 and 130-140.

The system 100 can deploy a workflow engine to a software container, of multiple software containers, in a cloud computing environment. For example, the system 100 deploys a copy of the server workflow engine 116 and a copy of the server workflow builder 114 to the first cloud software container 130 as the first cloud workflow engine 154 and the first cloud workflow builder 142, respectively. In another example, the system 100 deploys a copy of the server workflow engine 116 and a copy of the server workflow builder 114 to the client software container 120 as the client workflow engine 124 and the client workflow builder 122, respectively.

These examples describe the system 100 deploying a copy of the server workflow engine 116 and a copy of the server workflow builder 114 to different software containers 120 and 130. However, the system 100 can deploy a copy of the client workflow engine 124 and a copy of the client workflow builder 122, which may not be in the client software container 120, to the first cloud software container 130 as the first cloud workflow engine 154 and the first cloud workflow builder 142, respectively.

Since the system 100 deploys workflow engines and application definition metadata for workflow applications to software containers, but does not deploy any actual workflow applications to the software containers, the software containers do not have any end user code to build or compile as a package, as would have been required for a workflow application deployed to a software container. Consequently, any workflow engines that are deployed to software containers before they are required do not have to wait any build time prior to execution.

Components of the core application server 110, such as the server workflow engine 116. can have direct access to shared server resources, such as user authentication data and user authorization data that are stored in common cache. Since workflow engines that are deployed outside of the core application server 110 do not have direct access to the shared server resources, minor revisions are made to the externally deployed workflow engines to enable the invoking of another service to access such resources, either from the core application server 110, or locally, such as when a cloud service retrieves data from a horizontally scalable database.

If a user makes selections while using a workflow builder to build a workflow application, the system 100 can identify the workflow application's definition metadata based on the user selections, and save a copy of the application definition metadata. In some embodiments, the user selects an option displayed by the workflow builder to enable the system 100 to identify and save a copy of the workflow application's definition metadata. A workflow builder that is executing in a software container which is external to the core application server 110 can invoke other microservices to retrieve, validate, save, and deploy a workflow application's definition metadata. If the system 100 deploys the copy of the application definition metadata to any software container that stores a workflow engine, and the workflow engine responds to an invoking of the workflow application by executing the copy of the application definition metadata for the workflow application, the execution's result is as if the workflow engine executed the workflow application.

In addition to any deployment of a workflow engine to any container, the system 100 identifies application definition metadata, which may include input parameters, based on user selections for developing a user-defined application. For example, the system 100 identifies the first cloud application definition metadata for workflow customer orders service 166, which includes input parameters for workflow customer orders service, from the selections made by Acme Corporation sales manager Ann while she was using the first cloud workflow builder 142 to configure the first cloud application for workflow customer orders service. Examples of the input parameters for a cloud application for workflow customer orders service include parameters for the unique identifiers of each Acme product and/or service ordered and parameters for how many of each Acme product and/or service are ordered. In another example, the system 100 identifies the client's application definition metadata for workflow customer orders service 126, which include the input parameters for workflow customer orders service, from the selections made by Ann while she was using the client workflow builder 122 to configure the client workflow application for customer orders service. A user selection can be a choice made by an operator of a computer. An input parameter can be a factor which is received by a computer and which forms one of a set that defines a system or establishes the conditions of the system's operation.

Following the identification of application definition metadata for a user-defined application, the system 100 stores the application definition metadata for the user-defined application into a persistent storage. For example, the system 100 stores the first cloud application definition metadata for workflow customer orders service 166 into the first cloud software container 130, which stores the first cloud workflow engine 154. In another example, the system 100 stores the client application definition metadata for workflow customer orders service 126 into the client software container 120, which stores the client workflow engine 124.

These examples describe taking a workflow application's definition metadata that was created by a workflow builder in a software container and then storing the workflow application's definition metadata in the same software container, which also stores a workflow engine that subsequently executes the workflow application's definition metadata. However, the system 100 can take a workflow application's definition metadata that was created by a workflow builder in a software container and then store the workflow application's definition metadata in any number of other software containers, which store workflow engines that subsequently execute the workflow application's definition metadata.

While storing a workflow application's definition metadata in persistent storage, the system 100 also stores the user authentication keys and the user authorization keys in the persistent storage. These persisted keys enable a workflow engine to make an API call for the verification of a user's identity and permissions required to generate any tokens required for accessing and modifying database records, such as by using data manipulation language elements for Invocable Action, Get Records, and Update Records. Persistent storage can be a device that retains data after power to the device is shut off.

After storing application definition metadata for a user-defined application into persistent storage, the system 100 receives user context details and an invocation of the user-defined application. For example, the first cloud workflow engine 154 receives Acme's customer Bob's authentication and authorization data when Bob uses his desktop computer 104 to invoke a cloud workflow application for customer orders service. In another example, the client workflow engine 124 receives Ann's authentication and authorization data when Ann uses her laptop computer 102 to invoke the client workflow application for customer orders service. A user can utilize any of the clients 102-108 to invoke a user-defined application by communicating the unique name of the user-defined application, its user context details, and other input parameters as API parameters or Uniform Resource Locator (URL) parameters sent to a workflow engine.

User context details can be an individual feature about the circumstances that form the setting for an event involving a computer operator. User authentication data can be information related to the process of verifying the identity of a computer user. User authorization data can be information related to any permissions provided for a computer user. An invocation can be an action that initiates a software application.

Following receipt of user context details and an invocation of the user-defined application, a workflow engine executes in a software container and retrieves application definition metadata from a persistent storage. For example, the first cloud workflow engine 154 executes in the first cloud software container 130 and retrieves the first cloud application definition metadata for workflow customer orders service 166. In another example, the client workflow engine 124 executes in the client software container 120 and retrieves the client application definition metadata for workflow customer orders service 126 from the client software container 120.

Having retrieved application definition metadata from a persistent storage, a workflow engine inputs user context details, and possibly other input parameters, and executes the application definition metadata. For example, the first cloud workflow engine 154 inputs Bob's authentication and authorization data, the unique identifiers for each Acme product which Bob ordered and how many of each Acme product which Bob ordered, while executing the first cloud application definition metadata for workflow customer orders service 166, thereby executing a cloud workflow application for customer orders service. In another example, the client workflow engine 124 inputs Ann's authentication and authorization data and executes the client application definition metadata for workflow customer orders service 126, thereby executing the client workflow application for customer orders service.

While executing application definition metadata for a user-defined application, a workflow engine may invoke another user-defined application. For example, when the first cloud workflow engine 154 is executing a cloud workflow application for customer orders service by executing the first cloud application definition metadata for workflow customer orders service 166, the cloud workflow application for customer orders service needs to verify that each Acme product which Bob ordered is currently available and arrange to deliver the available products to Bob. Therefore, while executing the first cloud application definition metadata for workflow customer orders service 166, the first cloud workflow engine 154 may make external API calls that invoke a cloud workflow application for inventory service and a cloud workflow application for shipping service. These API calls can result in the fifth cloud workflow engine 162 executing the cloud application definition metadata for workflow inventory service 174 and the sixth cloud workflow engine 164 executing the cloud application definition metadata for workflow shipping service 176. By executing the cloud application definition metadata for workflow inventory service 174, the fifth cloud workflow engine 162 executes a cloud workflow application for inventory service, verifies that each Acme product which Bob ordered is currently available, and makes an external API call that returns the verification to the first cloud workflow engine 154 which invoked the cloud workflow application for inventory service. By executing the cloud application definition metadata for workflow shipping service 176, the sixth cloud workflow engine 164 executes a cloud workflow application for shipping service, verifies that delivery has been arranged for each Acme product which Bob ordered, and makes an external API call that returns the delivery details to the first cloud workflow engine 154 which invoked the cloud workflow application for shipping service.

Since the cloud workflow application for customer orders service, the cloud workflow application for inventory service, and the cloud workflow application for shipping service are invoked as microservices, rather than invoked as a large application that incorporates all of these services, the system 100 can efficiently scale out only the services that need to be increased without scaling out services that do not need to be increased, as each of these services can function independently at any scale. For example, when Bob orders the Acme products on Black Friday, the system 100 can quickly scale out in the cloud computing environment 128 by replicating the first cloud container 130 and its contents as the second through fourth containers 132-136 and their contents. Then the cloud computing environment 128 provides large numbers of instances of the cloud workflow engine, including the first though fourth cloud workflow engines 154-160, that can execute large numbers of instances of the cloud application definition metadata, including the first through fourth cloud application definition metadata for customer orders service 166-172. Consequently, the cloud computing environment 128 can efficiently execute large numbers of instances of the cloud workflow application for customer orders service, with more than sufficient capacity to also process customer orders from Chris' tablet computer 106 and Dana's smartphone 108. The cloud computing environment 128 has a significantly greater capacity than the core application server 110 to provide large numbers of instances of the cloud workflow engine and the cloud application definition metadata.

After executing application definition metadata, a workflow engine outputs a result based on executing the application definition metadata, which may include accessing database records and then creating, reading, updating, and deleting a database record. For example, the first cloud workflow engine 154, which executes in the first cloud software container 130, verifies Bob's identity as a favored customer who is permitted to order some Acme products at a discounted price, and outputs Bob's order of Acme products with the shipping details, which is stored in a newly created Acme database record. In another example, the client workflow engine 124, which executes in the client software container 120, outputs Ann's offline test of the client workflow application for customer orders service. A result can be a consequence, effect, or outcome of something. A database record can be a structured set of related items of information that are handled as a unit by a computer.

Although the previous examples describe containerized workflow engines executing metadata for commerce cart-based workflow applications, the system 100 can be applied to any type of workflow application. Heroku can use Knative Eventing, which can become the necessary infrastructure for asynchronous batch operations. After enabling the necessary infrastructure for asynchronous batch operations, the system 100 can enable a workflow application to subscribe to an event, such that when the event occurs, the event invokes the workflow application which is executed by a workflow engine executing the workflow application's definition metadata. By scaling out large amounts of asynchronous batch jobs, the system 100 can simulate changes using large amounts of historical data. Additional examples of use-cases that the system 100 can process efficiently include pre-processing data which goes into a core application which executed in the core application server 110. In an Internet Of Things use case, the system 100 may receive millions of events, with almost all of the events being noise, and only a few events requiring a response, such as opening a case when a threshold becomes high. In an example of post-processing data which comes out of the core application, the system 100 can respond to a trigger after a create, read, update, or delete operation in the core application by sending out mass emails.

Figure 2:
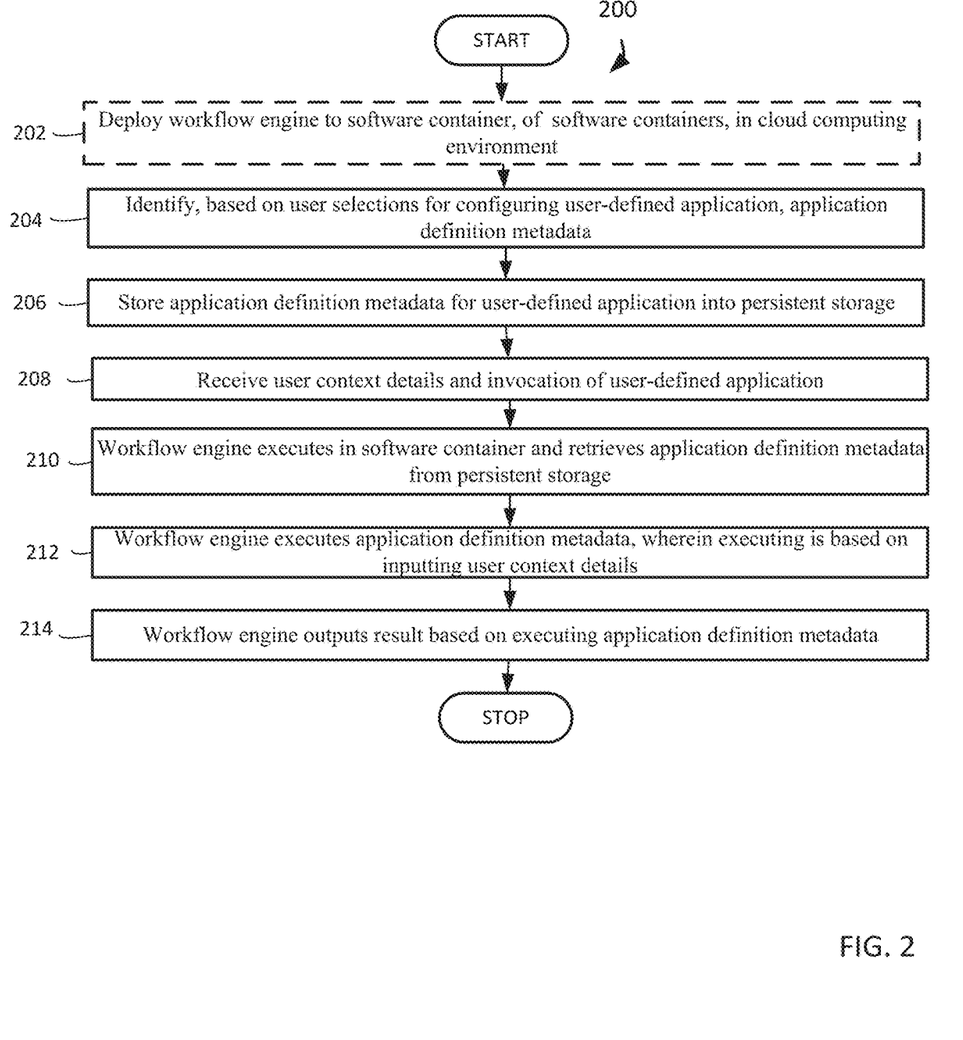
FIG. 2 is an operational flow diagram illustrating a high-level overview of a method for containerized workflow engines executing metadata for user-defined applications, in an embodiment.

FIG. 2 is an operational workflow diagram illustrating a high-level overview of a method 200 for containerized workflow engines executing metadata for user-defined applications. A copy of a workflow engine is optionally deployed to a software container, of multiple software containers, in a cloud computing environment, block 202. The system can deploy a workflow engine to a cloud platform. For example, and without limitation, this can include the system 100 deploying the copy of the server workflow engine 116 to the first cloud software container 130.

In addition to any deployment of a workflow engine to any container, application definition metadata is identified based on user selections for developing a user-defined application, block 204. The system can identify a no/low code development application's definition metadata based on a user's selections configuring the no/low-code development application. By way of example and without limitation, this can include the system 100 identifying the first cloud application definition metadata for workflow customer orders service 166 from the selections made by Acme Corporation sales manager Ann while she was using the first cloud workflow builder 142 to configure the first cloud workflow application for customer orders service.

Following the identification of application definition metadata for a user-defined application, the application definition metadata for the user-defined application is stored into a persistent storage, block 206. The system stores a no/low code development application's metadata for execution by a workflow engine. In embodiments, this can include the system 100 storing the first cloud application definition metadata for workflow customer orders service 166 into the first cloud software container 130, which stores the first cloud workflow engine 154.

After storing application definition metadata for a user-defined application into persistent storage, user context details and an invocation of the user-defined application are received, block 208. The system receives user context details when a no/low code development application is invoked. For example, and without limitation, this can include the first cloud workflow engine 154 receiving Acme's customer Bob's authentication and authorization data when Bob uses his desktop computer 104 to invoke a cloud workflow application for customer orders service.

Following receipt of user context details and an invocation of the user-defined application, a workflow engine executes in a software container and retrieves application definition metadata from a persistent storage, block 210. A workflow engine retrieves a no/low code development application's metadata for execution. By way of example and without limitation, this can include the first cloud workflow engine 154 executing in the first cloud software container 130 and retrieving the first cloud application definition metadata for workflow customer orders service 166 from the first cloud software container 130.

Having retrieved application definition metadata from a persistent storage, user context details are input by a workflow engine which executes the application definition metadata, block 212. A workflow engine executes a no/low development application's metadata. In embodiments, this can include the first cloud workflow engine 154 inputting Bob's authentication and authorization data and executing the first cloud application definition metadata for workflow customer orders service 166, thereby executing a cloud workflow application for customer orders service.

After executing application definition metadata, a result is output by a workflow engine based on executing the application definition metadata, block 214. The system outputs the results of a workflow engine executing a no/low code development application's metadata. For example, and without limitation, this can include the first cloud workflow engine 154, which is executing in the first cloud software container 130, outputting Bob's order of Acme products.

The method 200 may be repeated as desired. Although this disclosure describes the blocks 202-214 executing in a particular order, the blocks 202-214 may be executed in a different order. In other implementations, each of the blocks 202-214 may also be executed in combination with other blocks and/or some blocks may be divided into a different set of blocks.

System Overview

Figure 3:
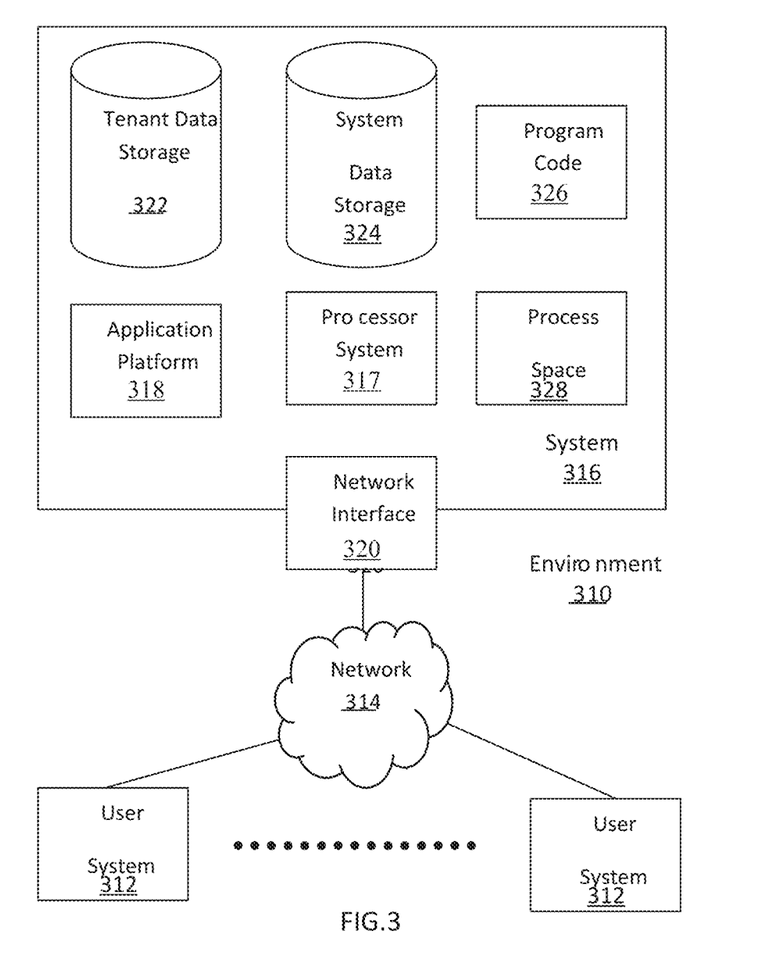
FIG. 3 illustrates a block diagram of an example of an environment wherein an on-demand database service may be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a workstation, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
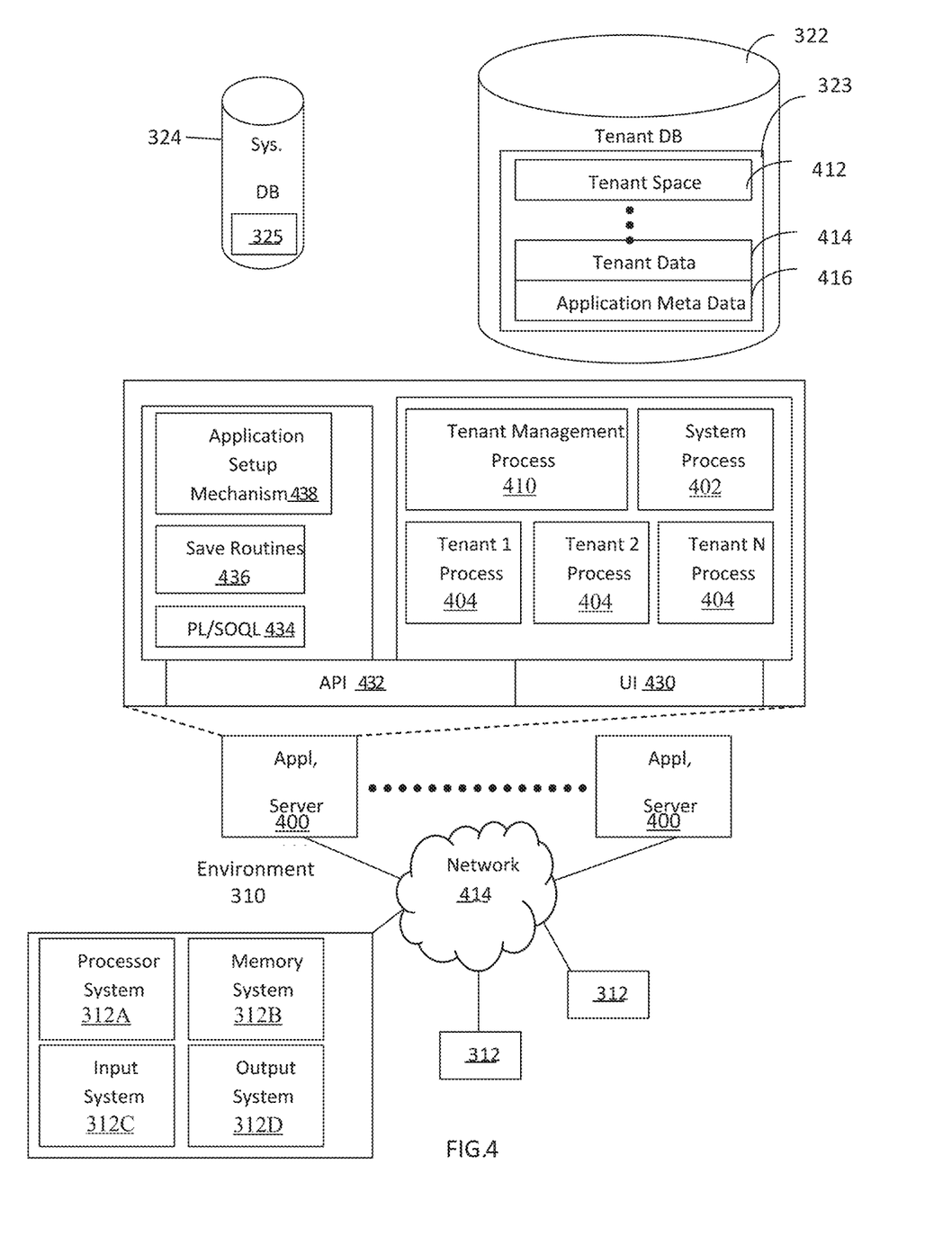
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICA- TIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 400$_1$ might be coupled via the network 314 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for containerized workflow engines executing metadata for user-defined applications, the system comprising:
   one or more processors; and
   a non-transitory computer readable medium storing a plurality of instructions, which when executed, cause the one or more processors to:
      identify, based on user selections for configuring a user-defined application, application definition metadata;
      store the application definition metadata for the user-defined application into a persistent storage;
      retrieve, by a workflow engine executing in a software container, the application definition metadata from the persistent storage, in response to receiving user context details and an invocation of the user-defined application;
      execute, by the workflow engine, the application definition metadata thereby executing the user-defined application that was configured based on the application definition metadata, wherein the metadata executing is based on inputting the user context details; and
      cause to be outputted, by the workflow engine, a result based on executing the application definition metadata.

2. The system of claim 1, comprising further instructions, which when executed, cause the one or more processors to deploy the workflow engine to the software container, of a plurality of software containers, in a cloud computing environment.

3. The system of claim 1, wherein the application definition metadata comprises input parameters.

4. The system of claim 3, wherein executing the application definition metadata comprises inputting the input parameters.

5. The system of claim 1, wherein executing the application definition metadata comprises using the user context details, comprising at least one of user authentication data and user authorization data, to access a database record and at least one of create, read, update, or delete the database record.

6. The system of claim 1, wherein executing the application definition metadata comprises invoking another user-defined application.

7. The system of claim 1, wherein the workflow engine is exposed as a microservice.

8. A computer program product comprising computer-readable program code to be executed by one or more processors when retrieved from a non-transitory computer-readable medium, the program code including instructions to:
   identify, based on user selections for configuring a user-defined application, application definition metadata;
   store the application definition metadata for the user-defined application into a persistent storage;
   retrieve, by a workflow engine executing in a software container, the application definition metadata from the persistent storage, in response to receiving user context details and an invocation of the user-defined application;
   execute, by the workflow engine, the application definition metadata thereby executing the user-defined application that was configured based on the application definition metadata, wherein the metadata executing is based on inputting the user context details; and
   cause to be outputted, by the workflow engine, a result based on executing the application definition metadata.

9. The computer program product of claim 8, wherein the program code includes further instructions to deploy the workflow engine to the software container, of a plurality of software containers, in a cloud computing environment.

10. The computer program product of claim 8, wherein the application definition metadata comprises input parameters.

11. The computer program product of claim 10, wherein executing the application definition metadata comprises inputting the input parameters.

12. The computer program product of claim 8, wherein executing the application definition metadata comprises using the user context details, comprising at least one of user authentication data and user authorization data, to access a database record and at least one of create, read, update, or delete the database record.

13. The computer program product of claim 8, wherein executing the application definition metadata comprises invoking another user-defined application.

14. The computer program product of claim 8, wherein the workflow engine is exposed as a microservice.

15. A computer-implemented method for containerized workflow engines executing metadata for user-defined applications, the computer-implemented method comprising:
   identifying, based on user selections for configuring a user-defined application, application definition metadata;
   storing the application definition metadata for the user-defined application into a persistent storage;
   retrieving, by a workflow engine executing in a software container, the application definition metadata from the persistent storage, in response to receiving user context details and an invocation of the user-defined application;
   executing, by the workflow engine, the application definition metadata thereby executing the user-defined application that was configured based on the application definition metadata, wherein the metadata executing is based on inputting the user context details; and
   causing to be outputted, by the workflow engine, a result based on executing the application definition metadata.

16. The computer-implemented method of claim 15, wherein the computer-implemented method further comprises deploying the workflow engine to the software container, of a plurality of software containers in a cloud computing environment.

17. The computer-implemented method of claim 15, wherein the application definition metadata comprises input parameters, and executing the application definition metadata comprises inputting the input parameters.

18. The computer-implemented method of claim 15, wherein executing the application definition metadata comprises using the user context details, comprising at least one of user authentication data and user authorization data, to access a database record and at least one of create, read, update, or delete the database record.

19. The computer-implemented method of claim 15, wherein executing the application definition metadata comprises invoking another user-defined application.

20. The computer-implemented method of claim 15, wherein the workflow engine is exposed as a microservice.

* * * * *